US008195705B2

(12) United States Patent
Calvignac et al.

(10) Patent No.: US 8,195,705 B2
(45) Date of Patent: Jun. 5, 2012

(54) HYBRID SEARCH MEMORY FOR NETWORK PROCESSOR AND COMPUTER SYSTEMS

(75) Inventors: Jean Louis Calvignac, Cary, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 2481 days.

(21) Appl. No.: 10/015,165

(22) Filed: Dec. 11, 2001

(65) Prior Publication Data

US 2003/0110180 A1    Jun. 12, 2003

(51) Int. Cl.
*G06F 17/30* (2006.01)
(52) U.S. Cl. .................. 707/797; 700/182; 711/108
(58) Field of Classification Search ............... 370/60, 370/94.1, 254, 351; 707/797; 709/202, 218; 711/202, 216, 217
See application file for complete search history.

(56) References Cited

U.S. PATENT DOCUMENTS

| 5,136,580 | A | 8/1992 | Videlock et al. ............. 370/60 |
| 5,414,704 | A | 5/1995 | Spinney .................... 370/60 |
| 6,061,712 | A * | 5/2000 | Tzeng ....................... 709/202 |
| 6,173,384 | B1 * | 1/2001 | Weaver ...................... 711/216 |
| 6,553,002 | B1 * | 4/2003 | Bremer et al. ............... 370/254 |
| 6,675,163 | B1 | 1/2004 | Bass et al. |
| 6,691,124 | B2 * | 2/2004 | Gupta et al. ................. 707/101 |
| 6,766,381 | B1 * | 7/2004 | Barker et al. ................ 709/246 |
| 7,107,265 | B1 * | 9/2006 | Calvignac et al. ............... 1/1 |
| 7,139,753 | B2 * | 11/2006 | Bass et al. ..................... 1/1 |
| 2005/0177552 | A1 | 8/2005 | Bass et al. |

FOREIGN PATENT DOCUMENTS

| EP | 0522743 A1 | 6/1992 |
| EP | 0594196 A1 | 10/1993 |
| JP | 06-205025 | 7/1994 |
| JP | 09-162922 | 6/1997 |
| JP | 10-257066 | 9/1998 |
| JP | 2000-022736 | 1/2000 |
| JP | 2000-209216 | 7/2000 |
| JP | 2000-349811 | 12/2000 |
| JP | 2001-326679 | 11/2001 |
| JP | 2001-357071 | 12/2001 |
| JP | 2002-024293 | 1/2002 |
| JP | 2002-166387 | 6/2002 |

(Continued)

OTHER PUBLICATIONS

Pending Patent Application, B. Bass et al., "Network Processor Processing Complex and Methods", U.S. Appl. No. 09/384,691, filed Aug. 27, 1999.

(Continued)

*Primary Examiner* — Angela Lie
*Assistant Examiner* — Mellissa M Chojnacki
(74) *Attorney, Agent, or Firm* — Joscelyn G. Cockburn (57) ABSTRACT

A system includes a data structure having a Direct Table (DT), Patricia-Trees, Pointers and high speed storage systems such as Contents Address Memory (CAM). The DT has a plurality of entries with each one coupled to a Patricia Tree having multiple nodes coupled to leaves. The number of Nodes, termed a threshold, that can be traversed to obtain information in the leaves is limited to a predetermined value. Once the threshold is reached a pointer indicates the address of the CAM and the address of the leaves is stored in the CAM. By using the structure and method the latency associated with tree search is significantly reduced.

12 Claims, 9 Drawing Sheets

FOREIGN PATENT DOCUMENTS

| | | |
|---|---|---|
| JP | 2003-209565 | 7/2003 |
| JP | 2003-273918 | 9/2003 |
| JP | 2004-015592 | 1/2004 |
| WO | 01/16763 A1 | 8/2001 |

OTHER PUBLICATIONS

Pending Patent Application, B. Bass et al., "Longest Prefix Match (LPM) Algorithm Implementation For a Network Processor", U.S. Appl. No. 09/544,992, filed Apr. 6, 2000.

Pending Patent Application, J. Calvignac et al., "Software Management Tree Implementation For a Network Processor", U.S. Appl. No. 09/545,100, filed Apr. 6, 2000.

PCT International Search Report dated Nov. 6, 2003.

D. S. Gibbs, et al., "A Content Addressable Memory for Data Communications", Microprocessors and Microsystems, IPC Business Press Ltd. London, GB, vol. 16, No. 2, 1992, pp. 59-66, XP000277788.

* cited by examiner

HYBRID SEARCH MEMORY FOR NETWORK PROCESSOR AND COMPUTER SYSTEMS

CROSS-REFERENCE TO RELATED PATENT APPLICATIONS

This application is related to, and contains common disclosure with, co-pending and commonly assigned patent applications "Network Processor Processing Complex and Methods", Ser. No. 09/384,691, filed Aug. 27, 1999; "Full Match (FM) Search Algorithm Implementation for a Network Processor", Ser. No. 09/543,531, filed Apr. 6, 2000; "Software Management Tree Implementation for a Network Processor", Ser. No. 09/545,100, filed Apr. 6, 2000; and "Longest Prefix Match (LPM) Algorithm Implementation for a Network Processor", Ser. No. 09/544,992, filed Apr. 6, 2000. Each co-pending patent application is hereby incorporated by reference into this description as fully as if here represented in full.

BACKGROUND OF THE INVENTION

The present invention relates to computer database structures and, more particularly, to Network Processor database structures.

PRIOR ART

The use of computer networks to distribute information is well known in the prior art. A conventional computer network includes a plurality of terminals interconnected by communications infrastructure. The infrastructure includes switches, routers, Network Processors and transmission facilities such as the internet and private network termed intranet. The routing and other decisions are usually made in the switches based upon information in the packets.

To support the decision making each Network Processor switch or other device is provided with a database and lookup method. As a packet is received the switch and/or network processor controller correlates the packet with the database and processes the packet based upon pre-stored information. An example of database lookup method is described in U.S. Pat. No. 5,414,704.

The speed with which the decision is made is very critical to the effectiveness of a network. A standard to measure the network effectiveness is its capability to process information (i.e. make the decision) at media speed.

The present invention, set forth below, enhances the speed at which the controller correlates a packet with the database.

SUMMARY OF THE INVENTION

The present invention uses a memory structure including a Direct Table (DT), a Patricia Tree Structure and Contents Address Memory (CAM) to store database information. The memory structure and method of searching reduce the latency associated with correlating a packet with the database in a Network Processor.

In particular the database structure includes a Direct Table (DT) partitioned into a plurality of entries. Each entry is associated with a Patricia tree having leaves and a plurality of nodes termed "Pattern Search Control Block (PSCB)". The action to be taken relative to a portion of a packet, termed a "key" matching an entry in the DT, is set forth in the leaf. To reach a leaf the tree has to be walked (details set forth below).

The latency, in general, is determined by the number of PSCBs separating the entry in the DT and the leaf. The greater the number of PSCBs the longer it takes to access information in the leaf; the fewer the number of PSCBs the quicker information is obtained. The process of accessing nodes towards the leaf of the tree is referred to as "tree walk", "walking the tree", etc.

The present invention sets a threshold which limits the number of PSCBs traversed between a table entry and associated leaf. Thereafter, a CAM stores the address whereat the leaf, containing the action to be taken relative to the frame, is located. By accessing the leaf the action to be taken relative to the frame is obtained.

The database is maintained by adding and/or deleting leaves of the trees. The addition and/or deletion may increase and/or decrease the number of PSCBs. To compensate for the database adjustments, appropriate deletion and/or addition is made to the CAM by the CAM aging mechanism.

One benefit of the present invention is that the latency of a memory-based look-up logic system is bounded (reduced) by using the assistance of a booster CAM and/or threshold according to teachings of the present invention. The threshold sets a limit on the number of PSCBs that can be traversed during a particular search.

Another benefit is that large Patricia tree structures can be implemented at lower cost if a CAM is used to track information relative to selected leaves whereas the other leaves are accessed through regular "tree walk" (discussed below).

Yet another benefit of the present invention is that the invention provides a relatively low cost and low latency solution for implementing large Patricia trees in data structure. Prior to the invention large Patricia-tree data structures were not acceptable in certain designs due to long latency associated with searching large Patricia tree data structures.

BRIEF DESCRIPTION OF THE DRAWINGS

The invention is better understood by reading the following detailed description of the preferred embodiment in conjunction with the accompanying drawings, wherein.

DETAILED DESCRIPTION OF THE PREFERRED EMBODIMENT

The present invention described herein can be used in any computer database system. It works well in network processors (NP) and as such will be described in that environment. However, this should not be construed as a limitation on the scope of the invention since it is well within the skill of one skilled in the art to make minor changes without deviating from the teachings and spirit of the present invention.

Figure 1:
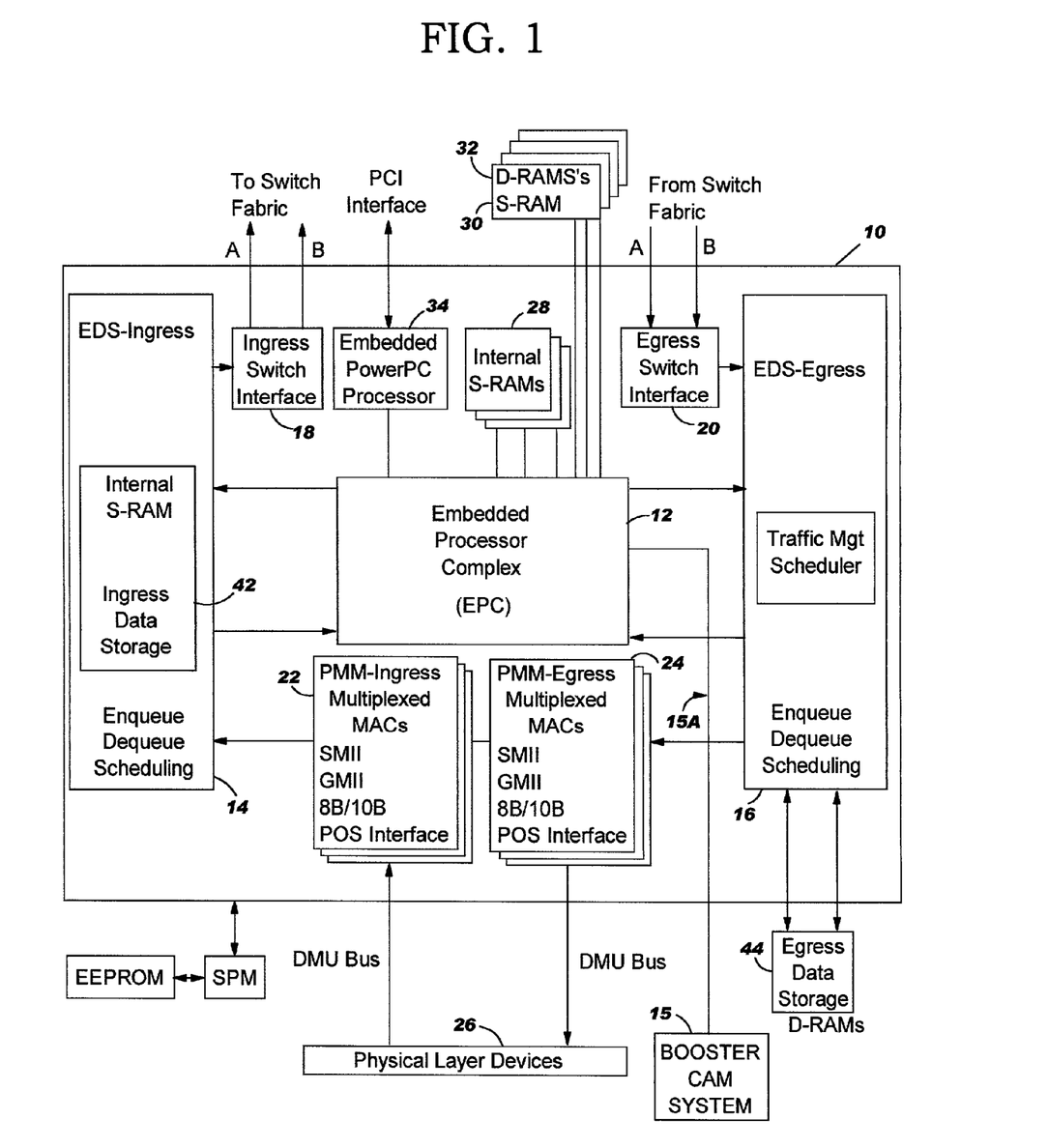
FIG. 1 illustrates an exemplary block diagram of a network processor in accordance with teachings of the present invention.

FIG. 1 shows an architecture for a network processor including the booster CAM system 15 according to the teachings of the present invention. The booster CAM system 15 is coupled to the embedded processor complex (EPC) 12 by communications media 15a. The network processor which may be implemented as a single chip or a plurality of chips include physical layer devices 26 including ethernet packets or IP over Sonet (POS); PMM-Ingress Multiplexed MACs 22; and Enqueue Dequeue scheduling 14 including Ingress Data Storage 42 and Ingress Switch Interface 18. On the Egress side the network processor includes Egress Switch Interface 20; Enqueue Dequeue Scheduling 16 and Egress Data Storage 44.

Still referring to FIG. 1, Embedded Processor Complex (EPC) 12 is coupled over communications media to the Ingress EDS and Egress EDS. A plurality of different storage modules including internal S-RAMs 28, D-RAMs 32 and External S-RAM 30 are connected to the Embedded Processor Complex. An Embedded Power PC Processor 34 is coupled to the Embedded Processor Complex. A PCI interface bus provides access from the external to the embedded processor 34. Although processor 34 is shown in FIG. 1 to be embedded, an alternate preferred embodiment is that the processor is provided externally and coupled through the physical layer devices to the network processor. As will be explained hereinafter, the data structures of the present invention are generated in Power PC 34 and downloaded into the storage modules. For brevity, only those elements and functions of the network processor that is relevant and germane to the present invention will be described hereinafter. Suffice it to say that the network processor is a programmable switching and routing system supporting among others ethernet packet and/or IP over Sonet. The Power PC 34, hereinafter called Control Point (CP), could be embedded as shown in FIG. 1 or in the alternate embodiment external but connected to the processor through physical layer devices 26 or other appropriate mechanism provides control and management support. The embedded processor complex includes a plurality of parallel protocol processors that provide processing capability. Each protocol processor has access to coprocessors that provides pattern search, data manipulation, internal data management, frame parsing, and data pre-fetching for filtering capabilities.

The present invention is particularly concerned with the filtering capability of the network processor and only devices which are used in this filtering or classification process will be described hereinafter. The devices include the embedded processor complex with its coprocessors; the CP 34, which is a general purpose processor provided externally or embedded; the booster CAM system 15 and the memories in which data patterns germane to the present invention are stored. As is explained in more detail below, a coprocessor correlates portions of a packet with data structure stored in network processor memory and extracts information which describes the action to be taken relative to the packet. The booster CAM system accelerates the speed with which this decision is extracted from the memory.

Figure 2:
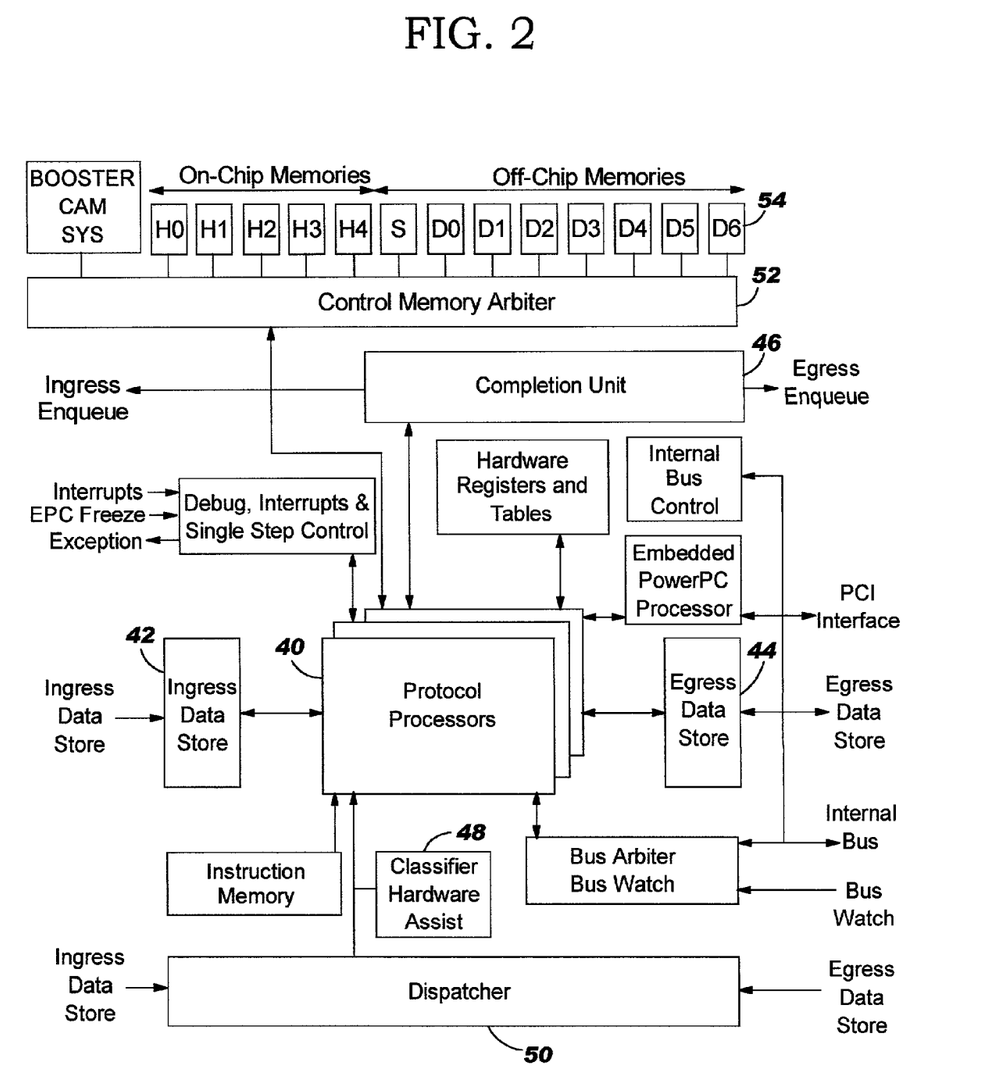
FIG. 2 illustrates details of the Embedded Processor Complex (EPC) in accordance with the teachings of the present invention.

FIG. 2 illustrates an exemplary embodiment for the embedded processor complex. It includes a plurality of protocol processors providing approximately 2128 MIPS sub-processing power. Each protocol processor 40 includes a 3-stage pipeline (fetch, decode and execute) general purpose registers, special purpose registers, an eight instruction cache, a dedicated arithmetic logic unit (ALU) and the coprocessors all running at 133 mhz. At least two of the protocol processors are specialized: one, termed the guided frame handler, for handling guided frames which transport information from the control processor to other entities within the network processor and one, termed the generic tree handler, for building look-up data in controlled memory and for searching the memory to determine what action to be taken relative to a packet.

Figure 3:
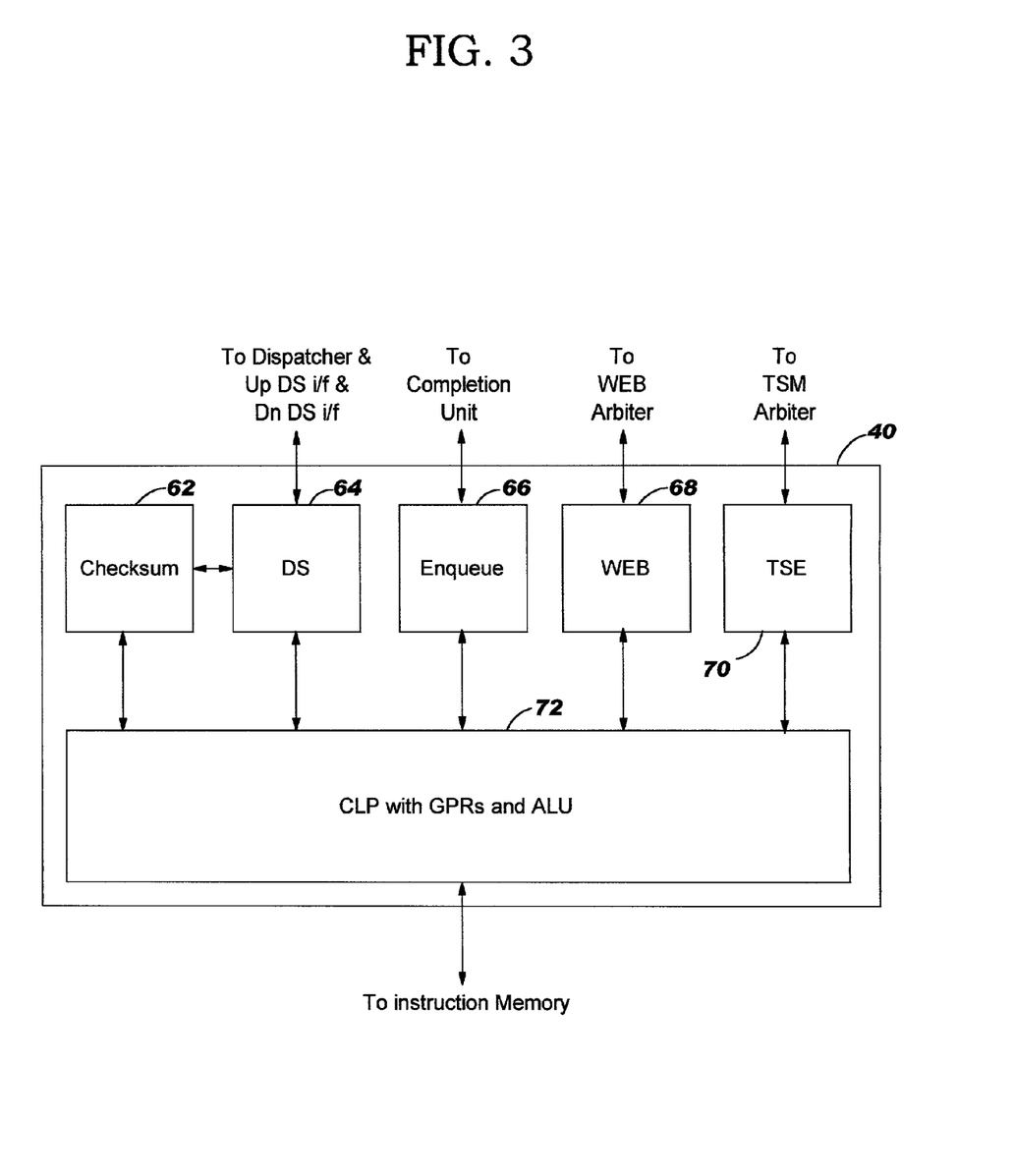
FIG. 3 illustrates a protocol processor structure in accordance with the teachings of the present invention.

FIG. 3 illustrates an exemplary embodiment of a protocol processor 40. The protocol processor 40 includes CLP (Core Language Processor) 72 with general purpose registers (GPRs) and arithmetic logic unit (ALU). Checksum coprocessor 62, data store (DS) coprocessor 64, enqueue coprocessor 66, WEB coprocessor 68 and tree search engine (TSE) coprocessor 70 are coupled over independent buses to the CLP.

The checksum coprocessor 62 calculates header checksums.

The data store (DS) coprocessor 64 interfaces frame buffer memory 42, 44 (Ingress and Egress directions) to provide direct memory access (DMA) capability.

Enqueue coprocessor 66 controls access to the 256-bit working register, containing key frame parameters. This coprocessor interfaces with the completion unit 46 (FIGS. 1 and 2) to enqueue frames to the switch and target port queues.

The WEB coprocessor provides all protocol processor access to internal registers, counters and memory for debugger statistics gathering.

The tree search engine (TSE) coprocessor 70 operates parallel with the protocol processor and performs tree search instructions (including memory READ, WRITE or READ/WRITE), memory range checking. The TSE coprocessor also does searching of packets against database stored in Patricia tree structure and accesses the booster CAM according to the teachings of the present invention. In an alternate embodiment, logic can be used to copy information in the CAM and/or delete information therefrom.

Referring again to FIGS. 1 and 2 the Control Point processor 34 which can be embedded as shown or attached through physical layer devices 26 to the network processor provide management for the overall network processor. To this end the data structures (to be discussed hereinafter) are generated in the general purpose processor and download in the memory. Updating such as deleting a leaf or adding one is effectuated through the CP processor 34 which uses the previously described guided cell to communicate control information between it and the embedded processor complex. The selected one of the embedded processor complex uses its associated tree search engine to communicate with the respective storage and the booster CAM system 15.

FIGS. 4 through 13 show different data structures according to the teachings of the present invention. The data structures are used to further explain the claimed invention.

Figure 4:
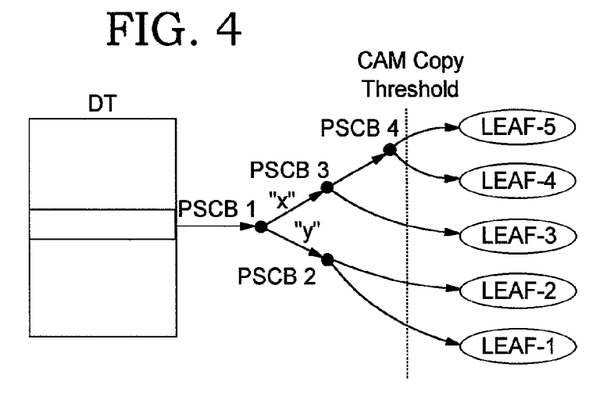
FIG. 4 illustrates a tree data structure according to teachings of the present invention.

FIG. 4 shows a graphical representation of a data structure stored in memories of the Network processor 10. The data structure includes direct table (DT) having a plurality of entries, only one is shown as an area bracketed by horizontal lines and is connected to a Patricia tree structure having a plurality of nodes termed Pattern Search Control Block (PSCB). Each of the PSCB, containing routing decision information, is connected to one or more leaves, five of which are shown in FIG. 4. Included in the leaves are decisions or actions to be taken relative to a packet which has been correlated against information stored in the tree structure. As stated previously, the correlation would be carried out by a picoprocessor (coprocessor) executing a pico instruction or pico code. In addition, the correlation may be carried out by other means without deviating from the teachings of the present invention.

Still referring to FIG. 4, a CAM copy threshold is associated with each tree structure. The CAM copy threshold (depicted as a vertical line) is a number which is stored in the system and indicates the maximum number of PSCBs that can be traversed to reach a leaf. Once the number of nodes traversed exceeds the CAM Copy threshold value the correlating mechanism (coprocessor or hardware) accesses the CAM to get information related to the leaf. Usually the address for the leaf is stored in the CAM rather than the information that is in the leaf. By storing only the address whereat the leaf is located, space in the CAM is conserved. Space in the CAM is at a premium because the CAM is a very high speed, low density, high priced storage mechanism. In FIGS. 4-13 the dash line labelled "CAM Copy Threshold" is a graphical representation of the threshold value which is stored in memory in the system. The information which is stored in the direct table is a replica of information in the packet which is being correlated with the data structure.

Figure 4A:
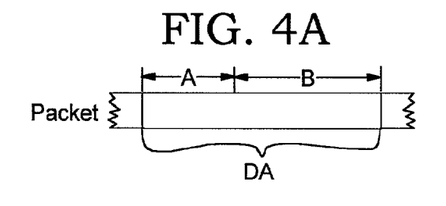
FIG. 4a shows a graphical representation of the portion of a packet used to correlate the packet with the database.

Turning to FIG. 4a for the moment the destination address (DA) of a packet to be correlated with the data pattern or structure is shown. The DA address is partitioned into sections A and B. The section A is used as an index in the direct table, and section B is used for walking the tree. As is used in this application, walking the tree means accessing the PSCBs and using information stored in one PSCB to progress to the next PSCB. The process is continued until a leaf is reached. The leaf stores information including action to be taken relative to the packet. In a preferred embodiment the destination address is a 48-bit MAC address. The first 16 bits labelled A are used to access the direct table, and the remaining 32 bits are used for walking the tree associated with that entry. More particularly, the first 16 bits of the MAC destination address are compared with entries in the DT. If a match is found between the first 16 bits and an entry, selected ones of the other 32 bits are used to walk the tree until the associated leaf is reached. It should be noted that a hashing procedure could be used to set up the DT and entry into the DT. Hashing procedures are well known in the art and will not be discussed further.

It should be noted that other entities in the packet could have been used to access the direct table and walk the tree associated with the entry. By way of example the entries in the direct table would correlate with section A of the frame. The coprocessor exercising the pico code correlates the direct table with the 16 bits of the particular packet. If an entry in the direct table matches the entry in the packet, the remaining 32 bits are used to walk the tree as follows: significant bits in the remaining 32 bits are matched against PCB1. If the bit is logical 0 then the action stored with 0 in the PSCB is performed. If the bit is logical 1, the action stored with 1 in the PSCB is performed. In essence, the information in the PSCB dictates whether the tree is walked along the path labelled "X" to PSCB 3 or along the path labelled "Y" to PSCB 2. The PSCB 2 would have information which points to the information in leaf 2 or leaf 1. If the "X" path is walked, the next node would be PSCB 3 then PSCB 4. In this example the threshold is set at 3 and since all the leaves are located under the threshold, the booster CAM would not be used.

Figure 5:
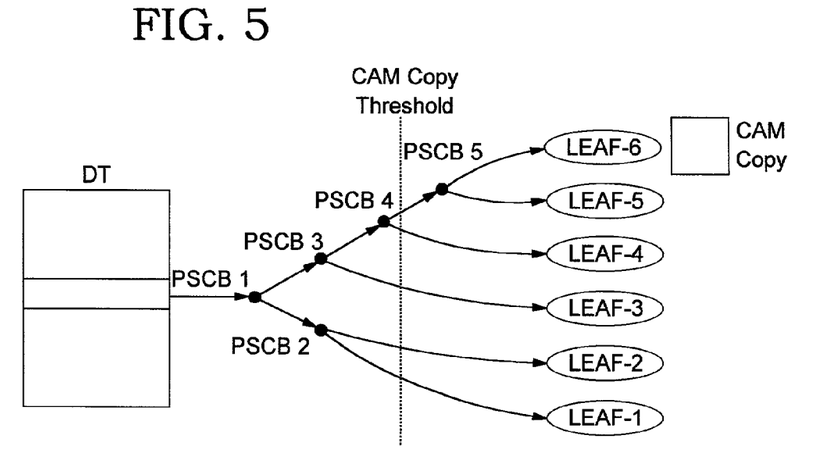
FIG. 5 illustrates a tree data structure in which leaf 6 is inserted above the CAM copy threshold. The leaf is inserted in the CAM only if it is required by network traffic.
Figure 14:
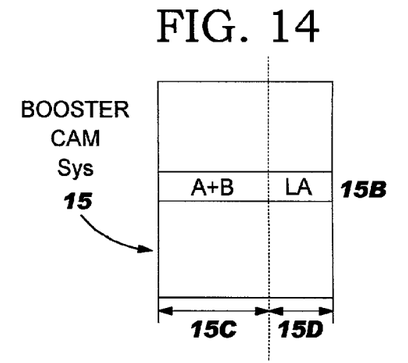
FIG. 14 illustrates the structure of data in the Booster CAM.

Turning to FIG. 14 for the moment a graphical representation for the booster CAM is shown. The CAM is an off-the-shelf item including mechanisms for writing information and aging (deleting) information in the CAM. The CAM is well known in the prior art, therefore detailed discussion will not be given here. Suffice it to say the CAM has several entries, one of which is shown at 15B. For purposes of the present invention, the CAM is partitioned into section 15C and section 15D. In section 15C the A+B portion of the MAC data address (FIG. 4a) is entered and the location address (LA) of the leaf from the tree structure is recorded in section 15D. In operation, the bits 32-48 of the destination address of the packet is stored in the booster CAM and is also used as an index to access the booster CAM of booster CAM system 15. The associated leaf address in section 15D of the booster CAM is read out and is used to access the information that is stored in the leaf address. Turning to FIG. 4 for the moment, the use of the booster CAM would not be applicable to the data structure in FIG. 4. This is so because the leaves in FIG. 4 are attached to PSCBs to the left of the CAM copy threshold which indicates that the PSCBs are below the set threshold. Conditions in which the CAM would be used because leaves are attached to PSCBs above the threshold will now be discussed. When a leaf is added in a tree, several situations may occur:

A) The leaf is inserted to a node above the threshold (i.e. right of CAM Copy Threshold). In this situation the insertion requires a search which will trigger a copy of the leaf in the CAM. FIG. 5 is an example of such a situation. In FIG. 5 the threshold is set at 3. Leaf 6 is inserted and is reached only after four nodes (namely PSCB 1, PSCB 3, PSCB 4 and PSCB 5). At insertion time the address for leaf 6 is copied into the CAM. Even though leaf 5 is now above the threshold it is not copied into the CAM if no traffic needs this leaf.

B) Another situation is that the leaf is inserted below the threshold and does not make any leaf cross the threshold. In this case nothing has changed regarding CAM contents.

C) Another condition is the leaf is inserted below the threshold but makes other leaf or leaves cross or falls outside of the threshold. In this case, any leaf having crossed the threshold will not be copied immediately in the CAM. Instead, it will be copied only at the time it will be reached by a regular look-up, i.e. when it is really used. Thus, the CAM contains only "useful" leaves needed by current network traffic.

Figure 6:
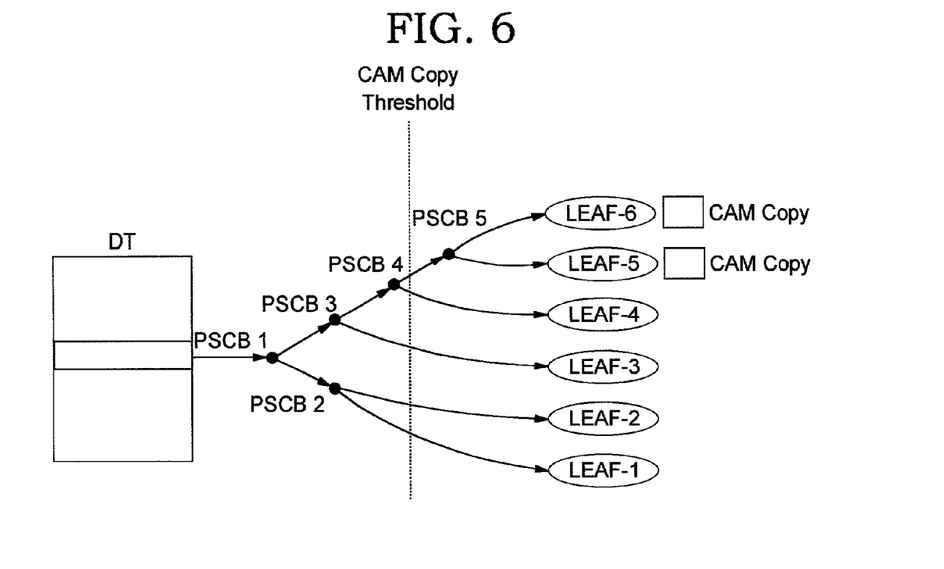
FIG. 6 illustrates a tree data structure in which leaf 5 is now above CAM threshold and is only copied because the leaf is required by network traffic.

D) FIG. 6 shows a situation where leaves 5 and 6 are now copied in the CAM at look-up time. It should be recalled that with reference to FIG. 5, when leaf 6 was copied in the CAM, leaf 5 was not because it was not required by traffic. However, as soon as it is required it is copied in the CAM. This again is a technique to preserve CAM resources since the CAM is a rather expensive type of storage.

Figure 7:
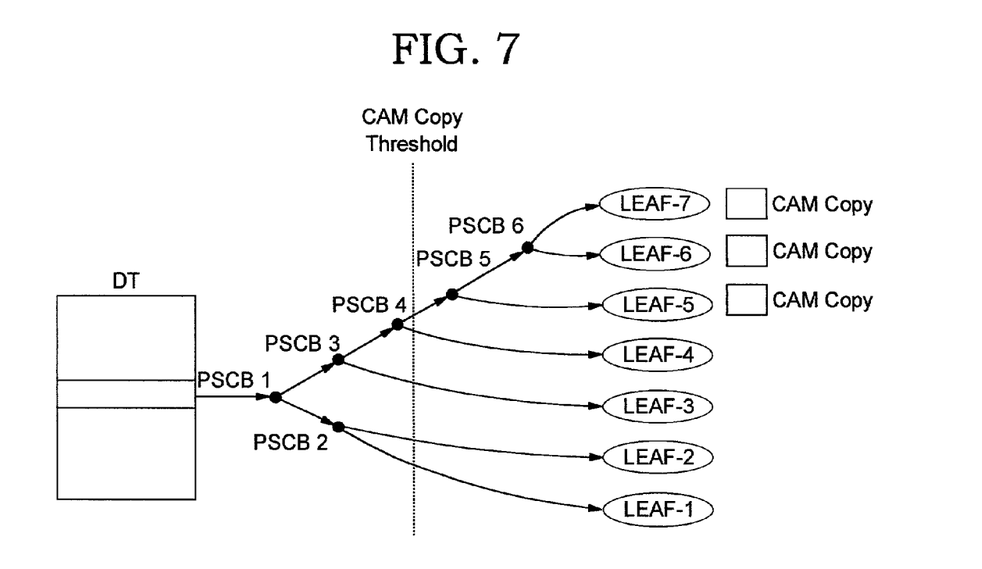
FIG. 7 illustrates a tree data structure in which a second leaf 7 is inserted above the CAM copy threshold.

E) FIG. 7 shows a situation where 3 leaves, namely: leaf 5, leaf 6 and leaf 7 are copied in the CAM. Leaf 7 is inserted since it is reached after 5 PSCBs (above threshold=3). It is copied in the CAM.

Figure 8:
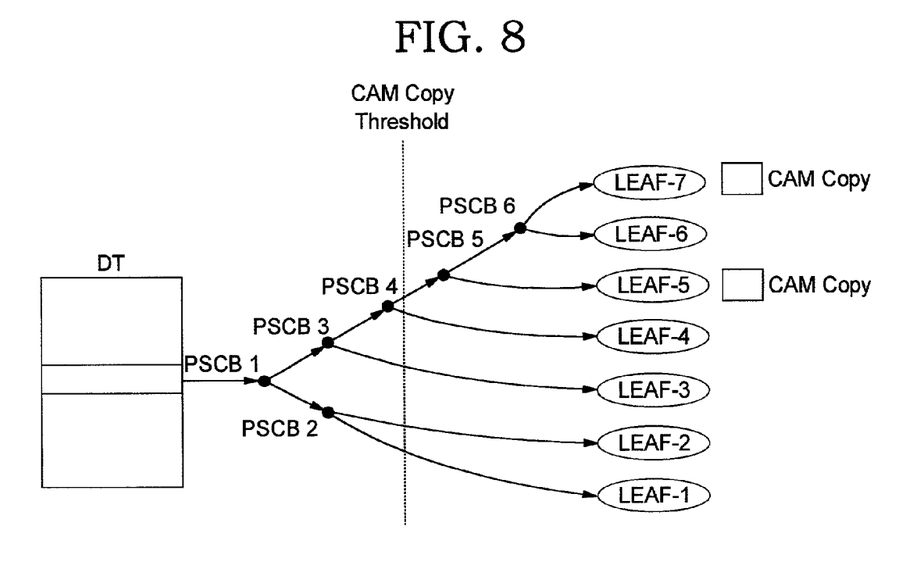
FIG. 8 illustrates a tree data structure in which a leaf not used by network traffic for a period of time is deleted from the CAM.

F) FIG. 8 shows a situation where the address for leaf 6 is deleted from the CAM. The deletion is carried out by the CAM aging mechanism. It is activated because leaf 6 has not been used by any traffic for a given period of time.

Figure 9:
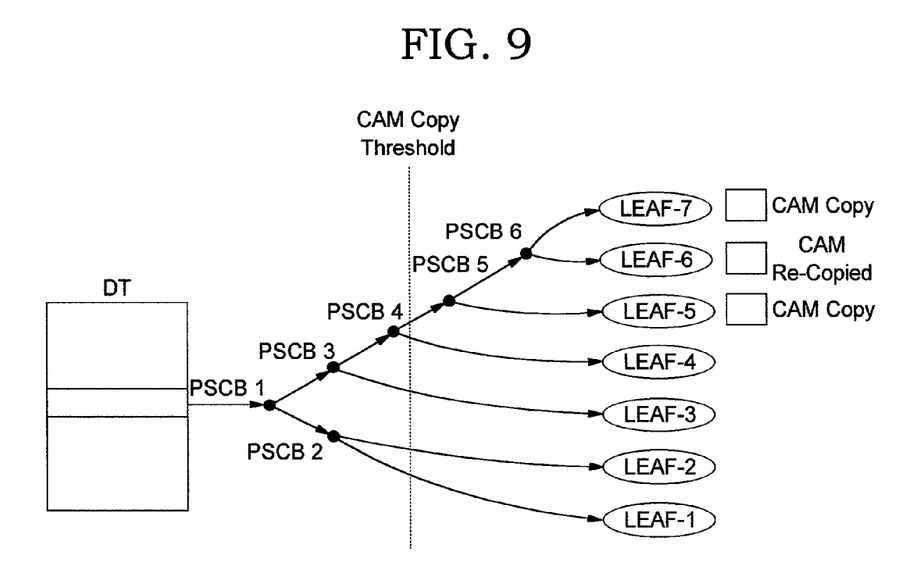
FIG. 9 illustrates a tree data structure in which the leaf deleted in FIG. 8 is now required by traffic and is re-copied in the CAM at look-up time.

G) FIG. 9 shows a situation where leaf 6 is re-copied in the CAM at look-up time. With respect to FIG. 8, leaf 6 was deleted because traffic did not require its use. In FIG. 9 traffic now needs leaf 6 again. Therefore, it is recopied in the CAM and marked accordingly. It should be noted that these examples indicate that the aging mechanism periodically will delete leaf information from the CAM based upon use or non-use of the information in the leaf.

H) Condition existing when a leaf is added to a tree has been discussed above. Condition existing when a leaf is deleted from a tree will now be discussed. The deletion of a leaf from a tree can be triggered due to aging or control point action. The aging phenomenon occurs when a leaf is not used for a period of time and the aging mechanism deletes it from the storage. The control point deletion occurs when the general purpose processor at the control point decides for whatever reason that a leaf should be deleted from the storage. In either case deletion by aging or control point if the leaf has the copied bit set to logical 1, then the corresponding entry is removed from the CAM.

I) If this leaf has the copied bit set to 0 the CAM contents is not changed. The consequence of a leaf deletion can be that other leaves that were above the threshold fall back under the threshold when a leaf is deleted. If these leaves have been previously copied into the CAM, then they will be deleted from the CAM by the CAM aging mechanism. The time-out for this aging is typically shorter than the tree aging. This allows an efficient reuse of the CAM entries by leaves more often used in look-ups. When a CAM entry is deleted by CAM aging, the corresponding leaf will be copied again in the CAM when it will be reached by the look-up. Only the look-up will have a duration above the threshold; the next ones will benefit from the CAM copy.

Figure 10:
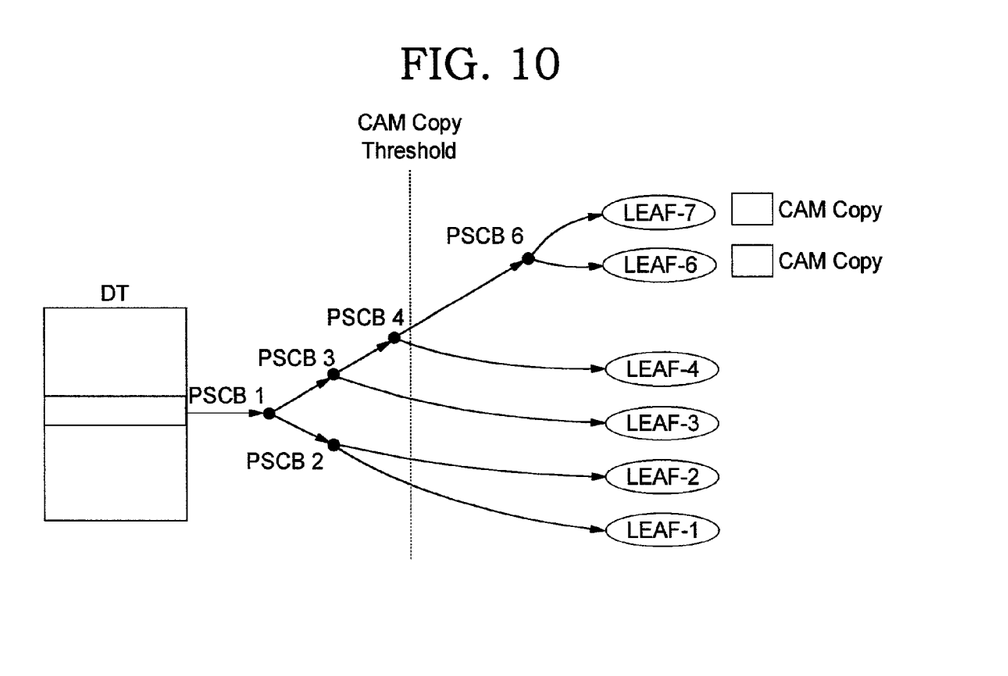
FIG. 10 illustrates a tree data structure in which a leaf is deleted from the tree and is likewise deleted from the CAM.

J) FIG. 10 shows the situation where leaf 5 is deleted from the tree. This deletion could be based on explicit delete action from the control point processor or by a tree aging mechanism. In this situation the CAM copy is also deleted. It should be noted that the CAM copies of leaf 6 and leaf 7 remain because they are attached to PSCB 6 which is above the threshold.

Figure 11:
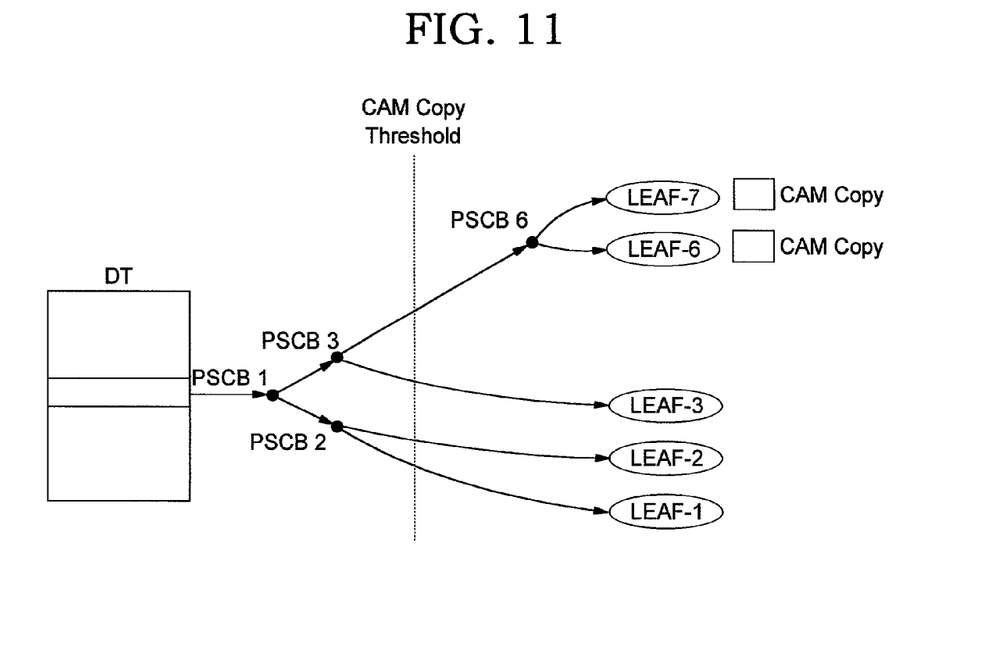
FIG. 11 illustrates a tree data structure in which deleted leaves cause leaves that were previously above the CAM Copy Threshold to fall below the CAM Copy Threshold.

K) FIG. 11 shows a situation where leaf 4 is deleted from the tree by explicit delete action or by tree aging. The CAM copy for leaf 4 is also deleted from the CAM. It should be noted that leaves 6 and 7 fall back under the threshold, but their CAM copies are not deleted at this time.

Figure 12:
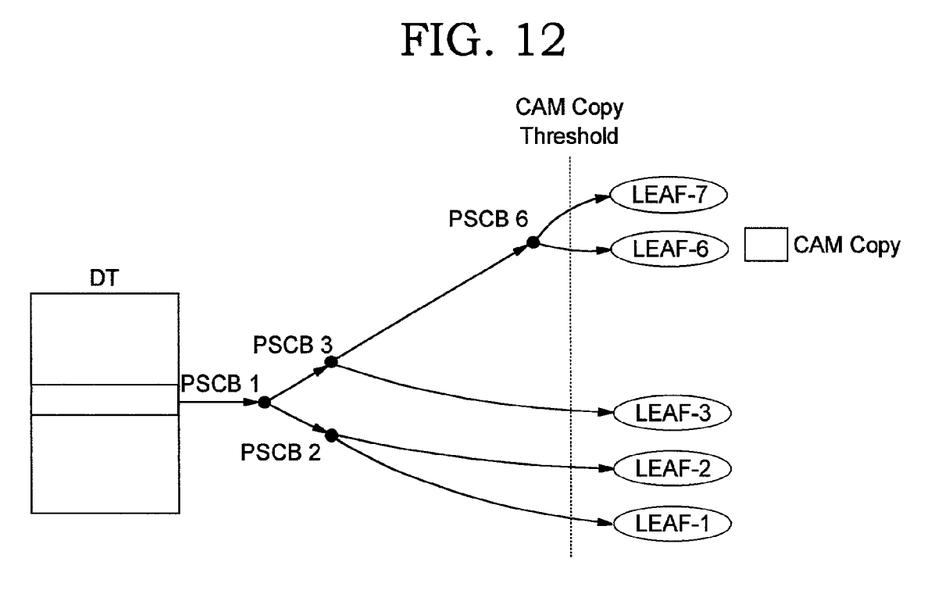
FIG. 12 illustrates a tree data structure in which a leaf 7 not used by traffic for a period of time is removed from the CAM.

L) FIG. 12 shows an example in which leaf 7 which was previously recorded in the CAM is now removed by the CAM aging mechanism. The removal is triggered because leaf 7 has not been used by any traffic for a given period of time.

Figure 13:
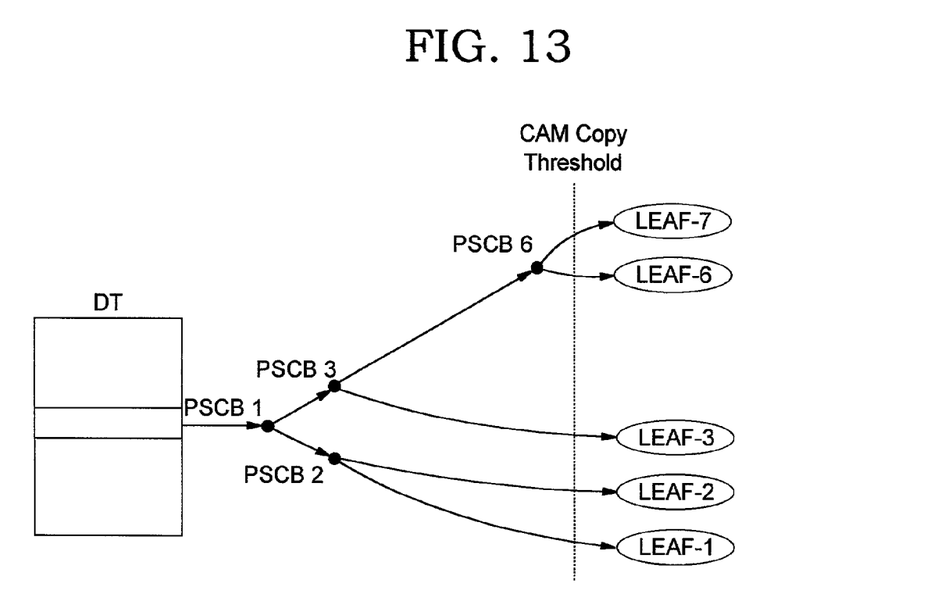
FIG. 13 illustrates a tree data structure in which another leaf 6 not used by traffic is deleted from the CAM.

M) In FIG. 13 leaf 6 has not been used for a given period of time, and the CAM aging mechanism deletes it from the CAM.

Figure 15:
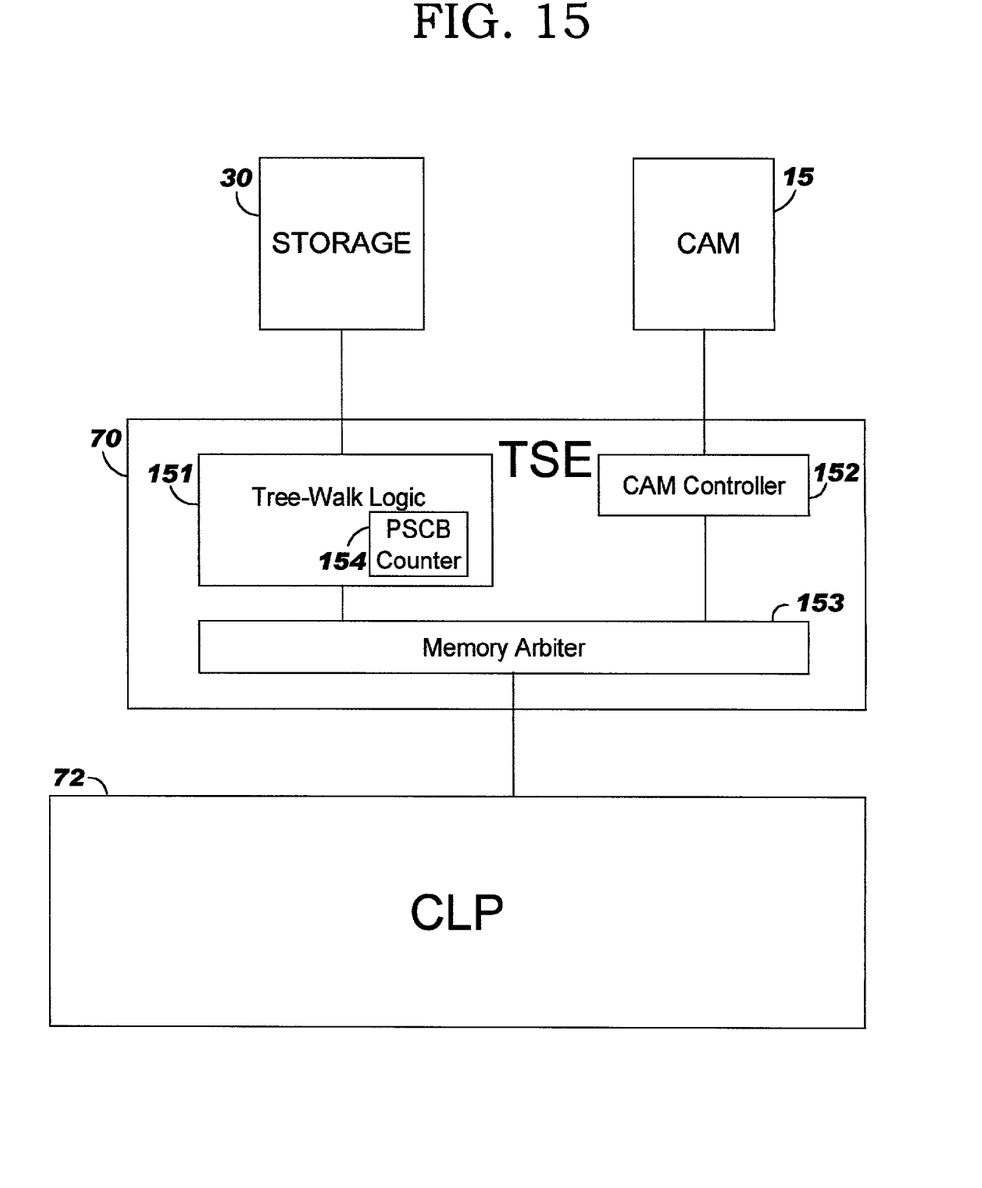
FIG. 15 shows a block diagram of the hybrid look-up mechanism according to the teachings of the present invention.

FIG. 15 shows a block diagram for the hybrid look-up mechanism according to the teachings of the present invention. The hybrid look-up mechanism includes CLP (Core Language Processor) 72, Tree Search Engine (TSE) 70, Storage 30 (S-RAM, DDRAM etc.) and CAM 15. The tree structures discussed above are stored in storage 30. The CAM information discussed above is stored in the CAM.

TSE 70 includes Tree-Walk Logic 151, CAM Controller 152, and Memory Arbiter 153. TSE is connected to CLP 72, to Storage 30 which could be S-RAM, D-RAM or any other appropriate memory and to CAM 15. The Storage stores the look-up data structure (DT, PSCBs, Leaves) discussed above. The CAM contains dynamic copies of keys as described previously.

The CLP 72 gives the key, generated from a frame, to be searched to the TSE. The Memory Arbiter 153 forwards the key to both the Tree-Walk Logic 151 and the CAM Controller 152.

The Tree-Walk Logic performs autonomously the first look-up step in DT, and continues the search operation by following the chain of PSCBs until reaching the leaf. When following the chain of PSCB nodes, the PSCB Counter 154 counts the number of nodes traversed.

Simultaneously, the CAM Controller forwards the key to the CAM which performs a fast search of this key.

The two operations started simultaneously can finish in any sequence, Tree-Walk Logic first or CAM first.

If the CAM finishes first, it returns a result (Leaf Address) to the Memory Arbiter which aborts the operation still running in the Walk-Tree Logic. This is because the key is found in the CAM and then there is no value in letting the search continue in the Tree-Walk Logic. The Memory Arbiter then issues a read request to the Storage through the Tree-Walk Logic in order to fetch the actual contents of the leaf.

If the Tree-Walk Logic finishes first, it returns a result (leaf address and leaf contents, PSCB Count) to the Memory Arbiter. The Memory Arbiter requests the CAM Controller to abort the search process in the CAM. This allows the aging mechanism of the CAM to delete CAM entries corresponding to keys which are actually searched very quickly (faster than through CAM) in the Storage, leaving then more room to other keys which would require longer search in the Storage.

The PSCB Count is included in the search result provided by the Tree-Walk Logic. It is used by the Memory Arbiter which compares it against a pre-configured threshold, so that if the threshold is exceeded, the Memory Arbiter requests the CAM Controller to add a CAM entry corresponding to the key just searched.

The threshold is configured so that a search operation in the Storage is guaranteed to be longer than a search in the CAM, in order to avoid requesting addition in CAM of keys which are already stored, but searched more slowly than in the memory.

While the invention has been described with reference to a specific embodiment, the description should not be construed as limiting the scope of the present invention.

It should be noted that those skilled in the art may modify the present invention or use a patent of it without deviating from the spirit and scope of the present invention. Accordingly, the foregoing description of the preferred embodiment is provided for the purpose of illustrating the principles of the present invention and should not be construed as a limitation thereof.

What is claimed is:

1. An apparatus comprising:
   an embedded processor complex including a plurality of protocol processors;
   a control point processor coupled to the processor complex;
   a plurality of hardware accelerator co-processors accessible to each protocol processor and providing high speed pattern searching, data manipulation and frame parsing;
   at least one memory device, coupled to the processor complex, that stores data structures including a Direct Table, nodes, and leaves chained together;
   a Memory location coupled to the processor complex and storing a value representative of the maximum number of nodes to be accessed during a tree search routine wherein said maximum number of nodes is fewer than a total number of nodes available to be accessed during said tree search routine;
   a Contents Address Memory (CAM) coupled to the processor complex and storing pointers identifying a location whereat a leaf is stored; and
   a circuit that deletes pointers from the CAM based on one of leaf adjustments in the tree structure and none use of the information within predetermined time interval.

2. The apparatus of claim 1 wherein the leaf contains information on actions to be taken relative to a packet.

3. The apparatus of claim 1 wherein the CAM further includes an indicia paired with the pointer, said indicia being selected from a portion of the packet.

4. The apparatus of claim 3 wherein the indicia includes a portion of a Destination MAC Address in the packet.

5. The apparatus of claim 1 wherein the leaf adjustments include deletion.

6. The apparatus of claim 1 wherein the Control Point Processor is programmed to generate and forward frames containing information that adjusts the data structure.

7. The apparatus of claim 6 wherein the adjustments include one of leaf deletion and leaf insertion.

8. The apparatus of claim 6 wherein the adjustments include leaf insertion.

9. An apparatus comprising:
   an embedded processor complex including a plurality of protocol processors;
   a control point processor coupled to the processor complex;
   a plurality of hardware accelerator co-processors accessible to each protocol processor and providing high speed pattern searching, data manipulation, and frame parsing;
   at least one memory device, coupled to the processor complex, that stores data structures including a Direct Table, nodes, and leaves chained together;
   a Memory location coupled to the processor complex and storing a value representative of the maximum number of nodes to be accessed during a tree search routine wherein said maximum number of nodes is fewer than a total number of nodes available to be accessed during said tree search routine;
   a Contents Address Memory (CAM) coupled to the processor complex and storing pointers identifying a location whereat a leaf is stored; wherein the CAM further includes an indicia paired with the pointers, said indicia selected from a portion of the packet; and
   a circuit that deletes pointers from the CAM based on one of non-use of the information within a predefined time interval and leaf adjustment in the tree structure.

10. A method comprising:
    providing a data structure configured as a tree having N nodes, N>1, and M leaves, M>1, coupled to the N nodes;
    generating with a first processor a key from a packet;
    setting a threshold having a value equal to a fixed predefined number of the N nodes to be traversed during a tree walk;
    providing in a CAM having at least one entry with information relating to the key, a pointer, and information relating to the data structure;
    selecting, with a second processor, bits from the key and traversing the tree based upon the bits until the threshold is met;
    searching the CAM;
    reading at least one entry in the CAM to detect a location whereat action to be taken relative to the packet is stored wherein the tree walk and CAM search are being executed sequentially; and
    deleting the pointer from the CAM based on one of none use of the information within a predetermined time interval and leaf adjustment in the tree structure.

11. A search method comprising the acts of:
    a) using N bits, N being an integer, from a packet as an index into a data structure including a Direct Table with at least one entry and a tree structure operatively coupled to said one entry;
    b) setting a threshold based upon a fixed number of nodes to be traversed in the tree structure;
    c) using select bits from the packet to traverse said tree structure until the threshold is met;
    d) storing in a Contents Address Memory (CAM) at least one entry based upon a predetermined characteristic of the packet, pointers, and a second predetermined characteristic of said tree structure;
    d1) reading the CAM;
    e) using the at least one entry to access a memory location whereat action to be taken relative to the packet is stored wherein traverse of the tree structure and CAM read are performed sequentially; and
    deleting pointers from the CAM based on one of leaf adjustment in the tree structure and none use of information in said CAM within a predetermined time interval.

12. A method for correlating a search key with a database comprising the acts of:
    a) using N bits, N≧1, from the search key as an index into the database including entries having a Direct Table with at least one entry and a tree structure coupled to said one entry;
    b) setting a threshold based upon a fixed number of nodes to be traversed in the tree structure;
    c) using M bits (M>1) from the search key to traverse said tree structure until the threshold is met;
    c1) storing in a CAM a pointer that points to a leaf and other information;
    d) reading from the leaf instructions that indicate an action to be taken relative to the search key wherein traverse of the tree structure and CAM read are performed sequentially; and
    d1) deleting from the CAM the pointer based on one of leaf adjustment in the tree structure and none use of the other information within a predetermined time interval.

* * * * *